United States Patent [19]
Pitz

[11] Patent Number: 6,020,705
[45] Date of Patent: Feb. 1, 2000

[54] PROCESS AND EQUIPMENT FOR POSITIONING A STEP MOTOR FOR A DISK PLAYBACK, RECORDING AND/OR EXTRACTING MACHINE

[75] Inventor: Ulrich Pitz, Sprendlingen, Germany

[73] Assignee: NSM Aktiengesellschaft, Bingen, Germany

[21] Appl. No.: 08/981,667

[22] PCT Filed: Jun. 17, 1996

[86] PCT No.: PCT/DE96/01093

§ 371 Date: May 13, 1998

§ 102(e) Date: May 13, 1998

[87] PCT Pub. No.: WO97/02515

PCT Pub. Date: Jan. 23, 1997

[30] Foreign Application Priority Data

Jul. 3, 1995 [DE] Germany ............... 195 24 136

[51] Int. Cl.[7] ................................................. G05B 19/40
[52] U.S. Cl. ..................... 318/561; 318/626; 318/685; 318/696
[58] Field of Search ................................ 318/560, 561, 318/602, 626, 638, 652, 653, 685, 696; 369/30, 33, 34, 36

[56] References Cited

U.S. PATENT DOCUMENTS

| | | | |
|---|---|---|---|
| 3,843,915 | 10/1974 | Helmbold | 318/602 |
| 4,129,813 | 12/1978 | Hunts et al. | 318/561 |
| 4,266,170 | 5/1981 | Inoue | 318/565 |
| 5,289,439 | 2/1994 | Koulopoulos et al. | 369/32 |
| 5,420,485 | 5/1995 | Campbell, Jr. | 318/34 |
| 5,431,520 | 7/1995 | Brugger | 414/277 |
| 5,517,101 | 5/1996 | Sakai et al. | 318/685 |
| 5,734,629 | 3/1998 | Lee et al. | 369/34 |
| 5,748,577 | 5/1998 | Sakiyama | 369/36 |

FOREIGN PATENT DOCUMENTS

| | | |
|---|---|---|
| 0021968 | 1/1981 | European Pat. Off. . |
| 0080531 | 6/1983 | European Pat. Off. . |
| 0205975 | 12/1986 | European Pat. Off. . |
| 0280263 | 8/1988 | European Pat. Off. . |
| 0138005 | 11/1988 | European Pat. Off. . |
| 0341945 | 11/1989 | European Pat. Off. . |
| 0360099 | 3/1990 | European Pat. Off. . |
| 0439483 | 9/1992 | European Pat. Off. . |
| 0588585 | 3/1994 | European Pat. Off. . |
| 2703450 | 10/1994 | France . |
| 95/32502 | 11/1995 | WIPO . |

*Primary Examiner*—Bentsu Ro
*Attorney, Agent, or Firm*—Venable; George H. Spencer; Norman N. Kunitz

[57] ABSTRACT

A playback, recording and/or extracting machine for disks designed as information carriers has opposite disk magazines that receive disk-holders or at least one disk in horizontally superimposed disk-receiving compartments and a computer-controlled transport device arranged between the disk magazines and provided with two horizontally movable drawing-out mean for the disk-holders. In order to monitor the driving motor of the transport device and drawing-out means, the driving motor is connected to an incremental signal generator that incrementally detects the position of the driving motor and thus allows the transport device and drawing-out means to be automatically and precisely positioned.

25 Claims, 14 Drawing Sheets

PROCESS AND EQUIPMENT FOR POSITIONING A STEP MOTOR FOR A DISK PLAYBACK, RECORDING AND/OR EXTRACTING MACHINE

This application is a National Stage under 35 U.S.C. 371 of International Application PCT/DE96/01093 filed Jun. 17, 1996.

BACKGROUND OF THE INVENTION

The invention concerns a machine for handling disks, provided with recorded information or which can be recorded on, in particular for the handling of compact disks known by the abbreviation CD. The invention also concerns processes for operating such a device.

The invention in particular concerns a disk handling machine with
- opposite-arranged disk magazines, which hold disk holders for respectively one disk in superimposed receiving compartments,
- a first transfer device in the form of a transport device, arranged between the disk magazines and connected to a first electric drive motor, for the selective transport of an individual disk holder with disk between optional receiving compartments, a receiving compartment and at least one disk drive for reading out or recording information on the disk, or between a receiving compartment or a disk drive and a drawer for the input and removal of disks,
- a second transfer device arranged on the first transfer device in the form of two displaceable pull-out means, connected to a second electric drive motor, for removing and inserting respectively one disk holder with disk into or from an optional receiving compartment,
- a computer-supported control unit for controlling and monitoring the movement sequences for the two transfer devices.

A disk handling machine with these features is known and is described, for example, in the WO-A-93/11535.

It is the object of the present invention to take measures that allow a reliable and exact positioning of the drive motors, used here to move the transfer devices.

SUMMARY OF THE INVENTION

The above object is achieved according to the present invention by a machine which comprises a device for handling disks configured as information carriers, in particular CD's, with opposite-arranged disk magazines that hold disk holders for respectively one disk in superimposed receiving compartments; a first transfer device in the form of a transport device that is arranged between the disk magazines and connected to a first electric drive motor for the optional transport of an individual disk holder with disk between optional receiving compartments, between a receiving compartment and at least one disk drive for reading out or recording information on the disk, or between a receiving compartment or a disk drive and a drawer for inserting and removing disks; a second transfer device arranged on the first transfer device in the form of two movable pull-out means, connected to a second electric drive motor, for removing and inserting respectively one disk holder with disk into or from an optional receiving compartment; a computer-supported control unit for controlling and monitoring the movement sequences of the two transfer devices. Each drive motor for this machine is a step motor with reversible rotational direction. Each drive motor is a step motor with reversible rotational direction. Each step motor is coordinated with an incremental signal generator for generating counting pulses corresponding to the motor movement and a device for counting these impulses. At least one stop position for its movement range is fixed for each transfer device, and at least one reference point sensor is provided, which monitors a reference position within the movement range and responds if the respective transfer device moves across this position. The control unit for each transfer device can be switched to a first operating state for calibration, where it switches off the current to the step motor to allow a manually guided movement of the respective transfer device while counting the counting pulses supplied by the respective incremental signal generator and in which it detects and stores the count that has run up when the reference-point sensor responds and the end position is reached. The control unit can furthermore be switched to a second operating state for calibration, in which it drives the corresponding step motor for moving the respective transfer device and counts the thereby generated counting pulses of the associated incremental signal generator and in which it detects and stores the count that has run up when the reference-point sensor responds and the end position is reached.

Thanks to the above-described features, all necessary reference values, which are needed for a reliable and exact control of the movement sequences in the useful operation, can be determined in a simple and reproducible way. Information on the motor position relative to a reference position can be obtained with the aid of the second operating state for calibration. The first operating state for calibration makes it possible to obtain information on the location of the reference position, relative to a movement range limit.

The use of a reference point sensor that is effective within the movement range of a mechanism and is used for calibration purposes is known from the arrangement according to EP-A-0 360 099. However, this reference does not disclose how the reference-point sensor is coordinated with other parts of the movement control system and how it is to be used to perform a calibration. It is also not mentioned what must be calibrated in detail. The arrangement according to the EP-A-0 360 099 contains a step motor, to be sure, but not an incremental signal generator on the step motor, nor any other instrument that would be capable of measuring the movements of the motor or therewith connected mechanism, even if the motor is rotated manually.

The EP-A-0 205 975 per se discloses how to design a control unit for a movement control system in such a way that it can be switched to an operating state where it allows a manual movement of the mechanism to be controlled, thereby detecting position data. This operating mode serves to program the movement sequences of a robot in that the programmer traces with the manual movement of the robot arm the paths that must later on be traveled automatically, wherein the successive movement positions are recorded in the form of coordinate values and are stored. The signals supplied by the position encoder are expressly referred to as "actual position signals," that is to say they must be supplied by an absolute value encoder, so that the option of using an incremental signal generator is practically closed. An operating state for calibration where a count of incremental signal generator pulses can be detected when reaching a reference position is not described in the EP-A-0 205 975.

The U.S. Pat. No. 4,266,170 discloses the use of a step motor in connection with an incremental signal generator, for which the transmitted pulses represent the angle rotation of the motor. However, no details concerning the means for calibrating this monitoring system are disclosed.

In a system described in the U.S. Pat. No. 4,129,813, the count for the pulses supplied by an incremental signal generator is used only to monitor the step motor for malfunctions, in that respectively one signal is supplied if a deviation is sensed between the motor control steps and the count or if the extent of the motor drive is not reached. The use of a four-phase step motor is described in connection with an incremental signal generator, which counts in dependence on the direction and contains a quadrature code disk for the direction encoding of the counting pulses, wherein a reference position is also fixed within the movement range for the system. This reference position is marked by a reference point on the code disk, and the reference for the counting values is provided through moving the motor electrically to the position, in which the reference point on the code disk reaches a known position. However, the U.S. Pat. No. 4,129,813 does not disclose an operating state for calibration, in which the step motor can be moved manually by counting the pulses transmitted by the incremental signal generator.

In a special embodiment of the machine according to the invention, an end point sensor is provided for the one end position of the movement range for each transfer device. It is preferable if one end point sensor respectively is provided for both end positions of the movement range for each transfer device. It is also preferable if the movement range for the respective transfer device corresponds to the turning range of the coordinated step motor.

In a special embodiment of the invention, the step motor for each transfer device is a four-phase step motor. The incremental signal generators preferably consist respectively of one optical two-phase encoder with code disk and one quadrature decoder. The code disk preferably is a slotted disk, provided mostly with 100 slots. The quadrature decoder preferably is a component of the control unit for the device. The code disk is chiefly arranged on the motor axle and the optical two-phase encoder on the housing for the drive motor.

A special, advantageous embodiment of the invention provides that the first transfer device is positioned such that it can move by sliding on two guide rods that extend parallel to each other and are arranged vertically and that it can be moved up and down via at least one belt drive with the coordinated step motor. It is preferable in this case if one of the guide rods is positioned such that it can rotate, and that in order to convert its rotational movement to a translatory movement for carriages of the second transfer device, this guide rod on the one hand is connected via a non-rotating, displaceable toothed wheel with the toothed belts of a belt drive connected with the carriages and, on the other hand, via an additional belt drive with the step motor for the second transfer device. The rotating guide rod preferably is connected via an additional belt drive with a code disk for the coordinated incremental signal generator.

As previously mentioned, the machine according to the invention allows a simple and reproducible determination and storage of all reference values for the control and monitoring of the movement sequences, as well as the use of these reference values for the useful operation. For this, the invention preferably provides the following processes:

With a first process, used to measure the absolute location of the reference position for a transfer device, relative to a movement range limit stop, the two operating states for calibration are turned on successively, wherein during the one operating state, the respective transfer device is guided over the reference position and the impulse count value for the coordinated incremental signal generator, run up when the reference position is reached, is recorded and wherein during the other operating state, the transfer device is moved to the one end position of the movement range and the count value reached when the end position is reached is recorded. The distance of the reference position from said end position is determined from the two recorded count values and is stored as number of motor increments in a non-volatile memory. The stored distance data is used during the useful operation of the machine as information for the absolute location of the reference position.

In a second process, used to reference the step motor, the second operating mode for calibration is turned on once the machine is started, wherein the respective transfer device is moved by the respective step motor across the reference position, and the count value for the impulses from the incremental signal generator, reached when the respective reference point sensor responds, is converted to a count relative to the number of motor steps and is stored in a memory. While the machine is turned on, this value is used in the subsequent useful operation as reference value for determining the position of the step motor.

The first process in particular offers several, special advantages. Production-related tolerances during the production of the machine do not enter into the accuracy of the movement control. The one-time manual adjustment does not require a readjustment, but only a proceeding in fixed steps, which can be preset and monitored by the central computer unit. No measuring instruments or other auxiliary means are required. The adjustment can be made at any time, if necessary, even at the set-up location for the machine.

The achievable accuracy for both processes is at ±2 motor steps if for one embodiment of the process, the count values for the incremental signal generator pulses are supplied as number of motor steps, wherein the motor steps per rotation of the step motor, detected by an encoder, are used for the relevant dimensioning.

Additional, special embodiments of operating processes for the machine according to the invention provide, either separately or in combination, that the count value for the incremental signal generator pulses is evaluated prior to, during, and following the movement of the respective transfer device, that if two end-point sensors exist, the step motor position is calibrated separately with the aid of each end position or that if two end-point sensors exist, the position of the step motor position with the aid of the closest end-point sensor, that the distance between the two end positions is measured to determine the total turning range for the step motor in motor steps, that the knowledge of the total turning range for the step motor is used by the control unit for computing the start-up and braking distances for the step motor, that during the useful operation of the machine, the sequence of steps transmitted to the step motor is compared to the respective count value for the incremental signal generator impulses, wherein the step motor is shut down for a difference greater than plus or minus four motor steps, that during the useful operation of the machine, following a movement of the respective transfer device, the actual position is computed from the count value for the incremental signal generator impulses and is compared to the desired position preset by the control unit, that the switched-off step motor is readied for operation in that it is supplied with current of an optional phase and the actual position is computed from the count value for the incremental signal generator impulses and is transmitted to the control unit, that following the completion of the movement or if the step motor is again supplied with current, the end of the decay process for the respective transfer device is determined with a periodic test in that the count change falls short of a specific amount.

The following important conditions for a reliable useful operation of a disk handling machine can thus be met, among other things:

Determination of the Reference Position for the Motor:

The exact knowledge of the position of the transfer device is of vital importance to the operation of the machine. If an interference occurs during a movement, e.g. of the transport device, or if the transport device impacts with an obstacle, this must be recognized under all circumstances. Otherwise, the assignment of the pull-out means to the receiving compartments of the disk magazine is not ensured. The present invention makes it possible to ensure that each motor movement is detected, as long as the machine is turned on. The same is also true for the movements of the pull-out means.

Following the start-up of the machine, a first movement across the reference-point sensor occurs. A count recorded during this movement is stored by the central computer unit in order to serve as reference during the subsequent useful operation of the machine.

Measuring the Location of the Reference-point Sensor:

The distance between the mechanical limit stops for the turning range, which are defined by end-point sensors, and the reference-point sensor can be measured via the incremental signal generator. The advantage here is that the inherent error of ±2 motor steps is omitted. The computer unit controls the movement of the associated transfer device across the reference-point sensor and memorizes the count (step 1). The current to the drive motor is switched off and the transport device or the pull-out means is pushed manually onto the bottom of the equipment housing or a limit stop on the side (step 2). The difference between the count recorded then and the count in step 1 results in the distance in motor steps, following a conversion. The distance is stored in the memory of the central computer unit.

Obstacle Recognition

During a movement of a transfer device, the sequence of steps supplied to the respective drive motor, and thus also its position, is constantly compared to the count. A malfunction is assumed and the drive motor is shut down for a difference greater than ±4 motor steps.

Detecting a Faulty Positioning:

Following a movement of a transfer device, the actual position is computed from the count and is compared to the desired position preset by the computer unit. The actual position is computed as follows from the count:

Step 1: the drive motor is supplied with current of an optional phase;

Step 2: the count is assumed to be the approximate actual position;

Step 3: the pertinent phase is computed from the actual position;

Step 4: the actual position is corrected by the difference between computed phase and actually applied phase (±2).

The last step is necessary in order to balance inaccuracies in the incremental position detection as well as deflections of the drive motor from the pole center, based on a moment acting upon it. In this way, a measuring or adjustment error of up to ±2 steps does not affect the computed position.

Start-up of the drive motor following an operational break or a movement error:

A switched-off drive motor is again readied for operation by supplying a current with optional phase (step 1) and by computing, as explained in the above, the actual position from the count and transmitting this to the central computer unit (step 2). The drive motor is therefore ready for operation without traveling to the reference-point sensor.

Detecting a Standstill of the Motor:

The end of the decay process of the drive for a transfer device at the end of the movement or after current is supplied once more is determined with a periodic test in that the count change falls short of a specific amount.

It is understood that the aforementioned features and those still to be explained in the following can be used not only in the respectively specified combination, but also in other combinations or by themselves, without leaving the framework of the present invention.

The concept upon which this invention is based will be explained in further detail in the following description with the aid of an exemplary embodiment shown in the drawing.

DETAILED DESCRIPTION OF THE PREFERRED EMBODIMENTS

Figure 1:
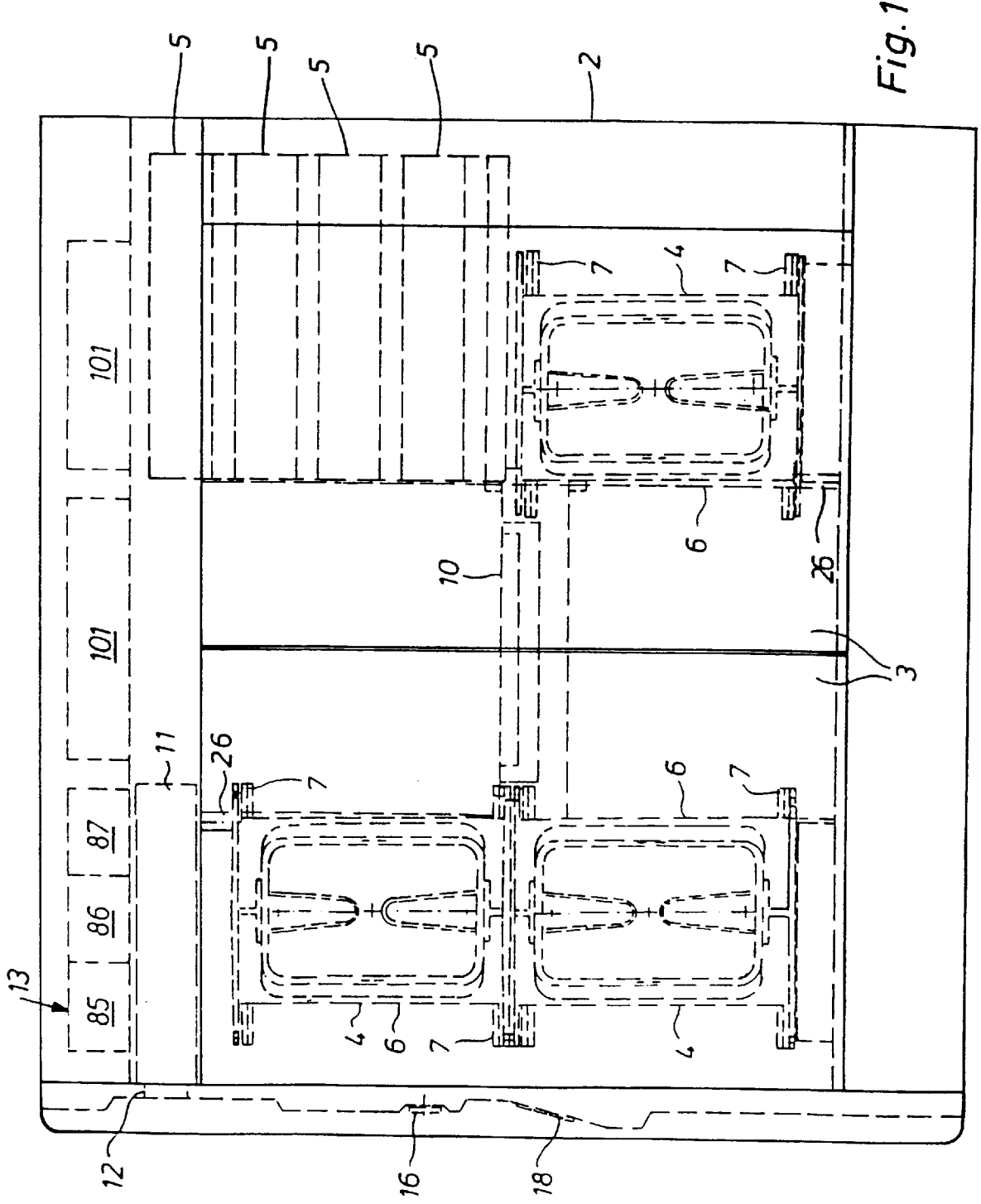
FIG. 1 is a frontal view of a handling machine for disks in accordance with the invention.
Figure 2:
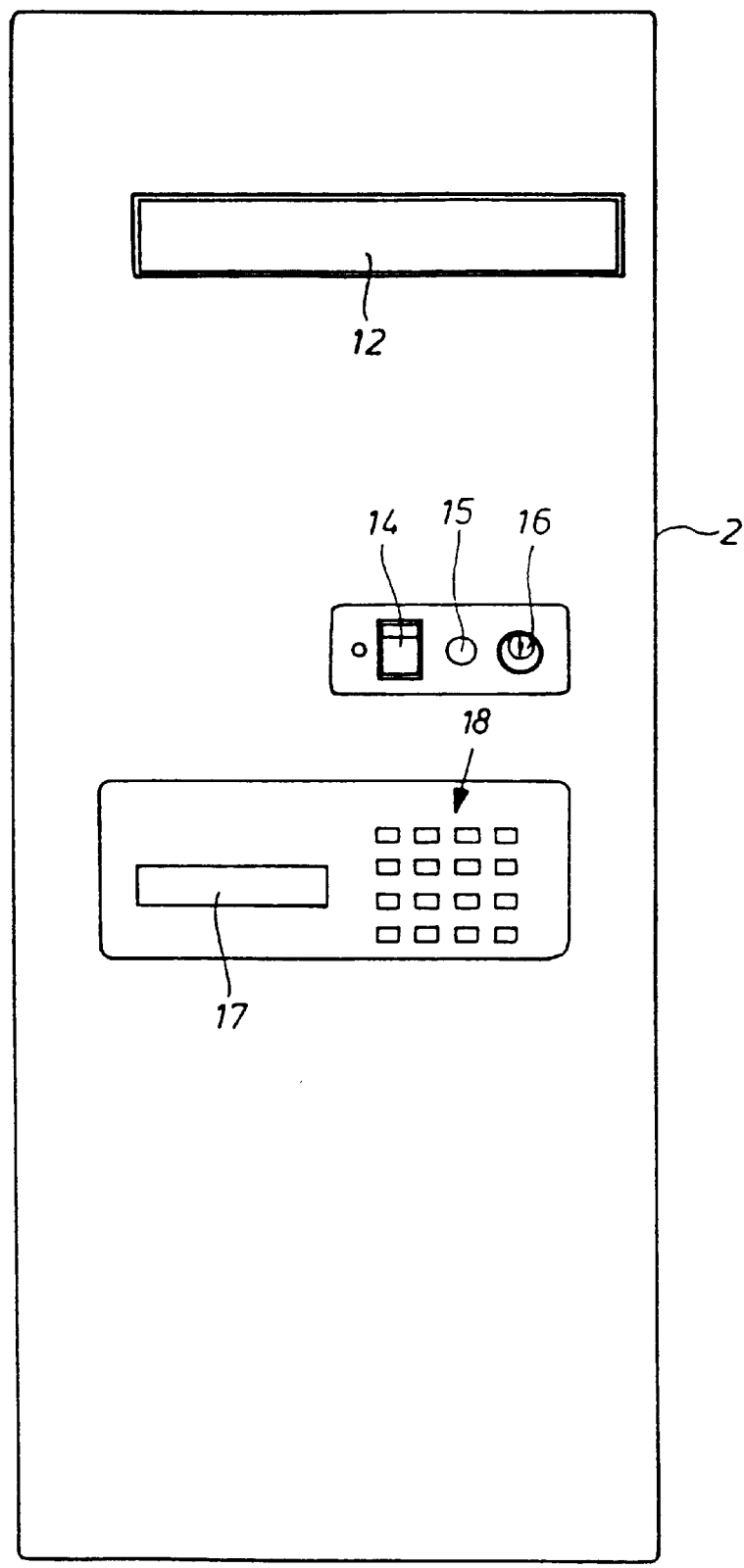
FIG. 2 is a side view of the machine according to FIG. 1.

The machine for handling the playback and/or recording and/or extracting of disks 1 comprises a housing 2 with a double door 3 attached to the front. Two disk magazines 4 are installed opposite each other on the side, in the lower region of housing 2. An additional, replaceable disk magazine 4 is located above the left disk magazine 4, whereas a tower composed of four replaceable disk drives 5 is provided above the right disk magazine 4. The disk drives 5 are used for reading out or recording information from or onto a disk 1.

The disk magazines 4 with mutually identical design respectively have a plurality of superimposed receiving compartments 6 for storing a corresponding number of disk holders 7 holding one disk 1 each. The free space between the disk holders 7 in this case is smaller than the thickness of disk 1 inserted into the disk holder 7. The thickness of the disk holder 7 furthermore only slightly exceeds the thickness of disk 1. The disk 1 has a thickness of approximately 1.2 mm and the disk holder 7 has a thickness of about 2.8 mm. This results in an extremely low height for a disk magazine 4 with fifty superimposed disk holders 7. The position of disk holder 7 inside the receiving compartment 6 is secured by two opposite-arranged spring elements 8, which are attached to the disk magazine 4. A first transfer device in the form of a transport device 10 that moves up and down is provided for transferring the disk holder 7, as well as a second transfer device in the form of two pull-out means 9, which are arranged on the transport device 10. In the position ensured by the spring elements 8 and by freeing the corresponding side wall of disk magazine 4, the disk holder 7 projects so far over the pull-out side of the disk magazine 4 that it can be gripped by one of the two pull-out means 9 of a transport device 10 for disk holder 7 holding one disk 1, which transport device can be moved up and down in the space between the disk magazine 4 and the disk drives 5. A disk-loading/extracting drawer 11 is located above the two left disk magazines 4, which has a coordinated input/output chute 12 for a disk holder 7 with disk 1 on the side and can also be served by the transport device 10. Forced by the control, the disk holder 7 remains inside the drawer 11 if the drawer 11 is pulled out, meaning that when a disk 1 is put into or extracted from the drawer 11, the disk holder 7 cannot be removed from it. All functions of the equipment are controlled with an internal computer unit 13, arranged above the drawer 11, which is connected to an on/off switch 14, a door opener 15, a key-operated switch 16, a display 17 and a keyboard 18 for the operating keys.

The two pull-out means 9, which can be moved horizontally on the transport device 10, at the same time can be moved relative to each other in opposite direction and intersecting, that is between a readiness position for removing a specific disk holder 7 with the desired disk 1 from the corresponding disk magazine 4 or the corresponding disk drive 5 or from the drawer 11 and a transport device position for removing the disk holder 7 from the transport device 10. In the readiness position as well as the transport device position, both pull-out means 9 are not engaged with the disk holder 7. In these positions, however, the pull-out means 9 can be made to engage with the disk holder 7, respectively as an option. Each pull-out means 9 comprises a carriage 21, which is guided with a sliding movement along a horizontal support rod 19 and is provided with a gripping slider 20 that can be inserted or removed for a disk holder 7. On its longitudinal sides, respectively in the frontal region, the disk holder 7 has a recess 22 into which the gripping slider 20 of the respective carriage 21 can engage, corresponding to the position of the disk holder 7 in the receiving compartment 6 of the respective disk magazine 4 or in the transport device 10. The carriage 21, assigned to the right disk magazine 4, is attached to the front belt 23 and the carriage 21, assigned to the left disk magazine 4, is attached to the rear belt 24 of a belt drive 40 that is connected to a drive motor 25 with reversible rotational direction.

The rear region of housing 2 contains two guide rods 26, 26a that extend parallel to each other and are arranged vertically, on which the transport device 10 is positioned such that it can move by sliding. A belt 28 of a belt drive 29 is assigned on the side to each guide rod 26, 26a, which belt runs parallel to it and is guided over deflection pulleys 27, wherein each belt 28 is connected via a clamping holder 30 with the transport device 10. The lower deflection pulleys 27 are connected via an axle 32 that is held in bearings 31. The axle 32 supports an additional deflection pulley 33 for a belt 34, which is connected to the drive wheel 35 of a drive motor 36 with reversible rotational direction. In order to detect its lower starting position, the transport device 10 is coordinated with a sensor 38, arranged on a printed circuit board 37 and designed as forked-contact coupler, into which a web 39, attached to the underside of the transporting device, engages while the transport device 10 is in the lower position. Both guide rods 26, 26a of the transport device 10 are positioned such that they can rotate. A toothed wheel 42 is arranged by means of a groove-spring guide 41 on the right guide rod 26, such that it can be moved and does not rotate, which toothed wheel is connected to the toothed belt 43 of the belt drive 40 that is connected to the carriages 21. A toothed wheel 44, which is locally fixed on the transport device 10, is positioned opposite the toothed wheel 42 and functions as deflection pulley for the toothed belt 43. At its lower end, the right guide rod 26 has a non-rotating toothed wheel 44 for additional belt drive 45, which cooperates with the drive wheel 46 of the drive motor 25 with reversible rotational direction. The right guide rod 26 furthermore is connected at the lower end via an additional belt drive 47 with a code disk 49 that is positioned on an axle 48 and is coordinated with two sensors 50, designed as forked-contact couplers and mounted on the printed circuit board 37. The readiness position and the transport device position of the carriages 21 for the pull-out means 9 can be monitored with the aid of these sensors 50, which generate position pulses.

A reversible link motion 51 controls the movement for inserting and removing the gripping sliders 20 of carriage 21 for the pull-out means 9. The link motion 51 is configured such that for a movement in opposite direction of the carriages 21 from the readiness position or from the transport device position, the gripping slider 20 of either the right or the left carriage 21 selectively is forced to move to the engagement position with the disk holder 7. The gripping sliders 20 are offset in the frontal region, in opposite direction. As a result of this offset, the frontal regions of the gripping sliders 20 can always pass each other in one plane during an intersecting movement of the carriages 21 in opposite direction, where one gripping slider 20 is always in the pulled-out position owing to the link motion 51, meaning that a pulled-out gripping slider 20 transports a disk holder 7 with its frontal region, while the frontal region of the other, inserted gripping slider 20 moves in the opposite direction, behind the frontal region of the pulled-out gripping slider 20.

A rectangular support arm 53 for holding a disk holder 7 is provided at the housing 52 for the transport device 10. The top of the support arm 53 is designed as closed cover 54 for the underneath positioned disk holder 7 with associated disk 1. The cover 54 functions as dust protection. In the region where the disk 1 is held by the disk holder 7, the cover 54 is designed as a transparent pane 55 for observing the disk 1. Through this pane 55 passes the light beam of a locally fixed sensor for detecting the actual presence of a disk 1 in the disk holder 7, which sensor is designed as light barrier.

Figure 3A:
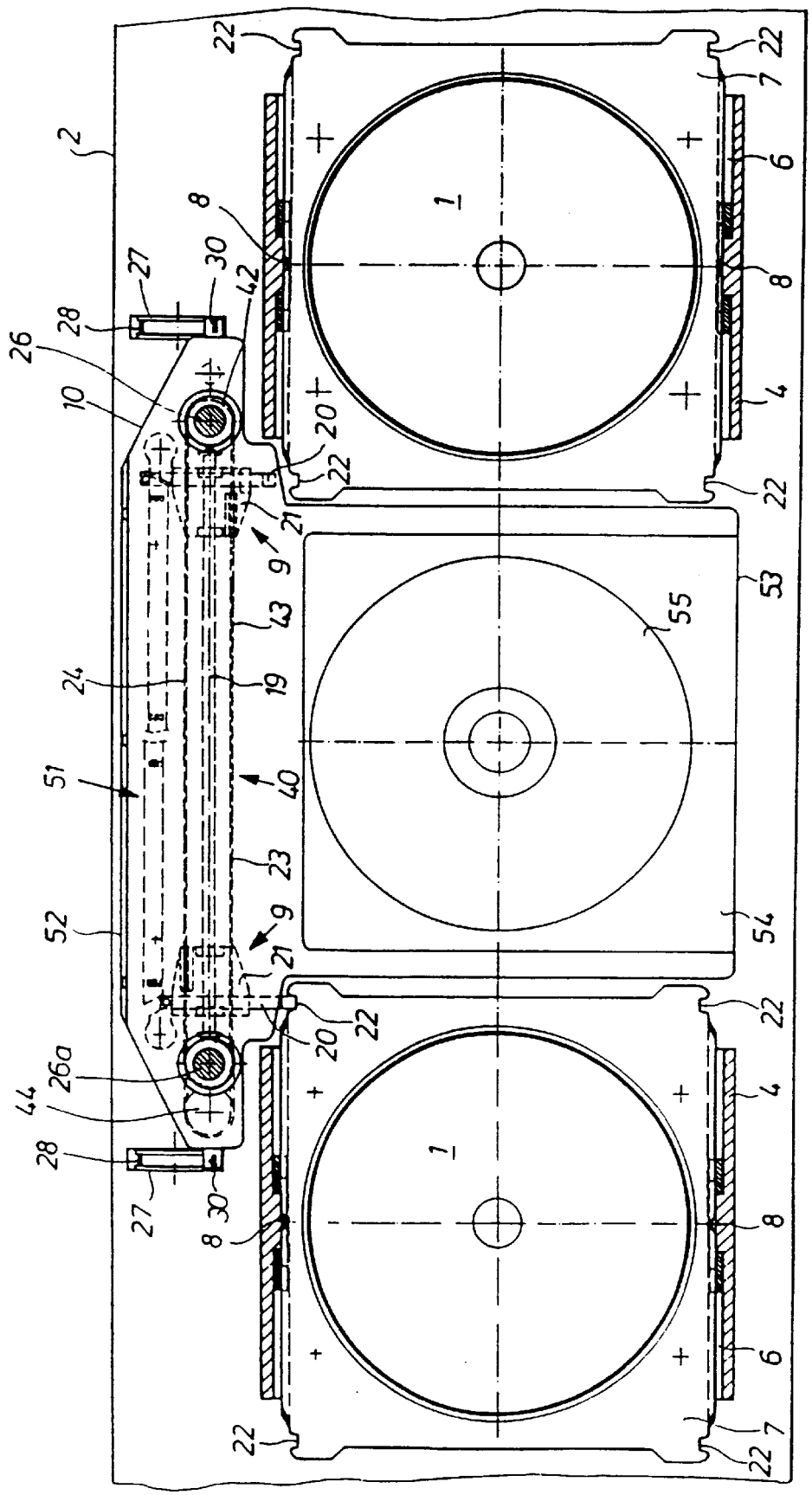
FIGS. 3a to 3c are respectively one cross section through the machine according to FIG. 1, in various positions for the pull-out means for the disk holders.
Figure 3B:
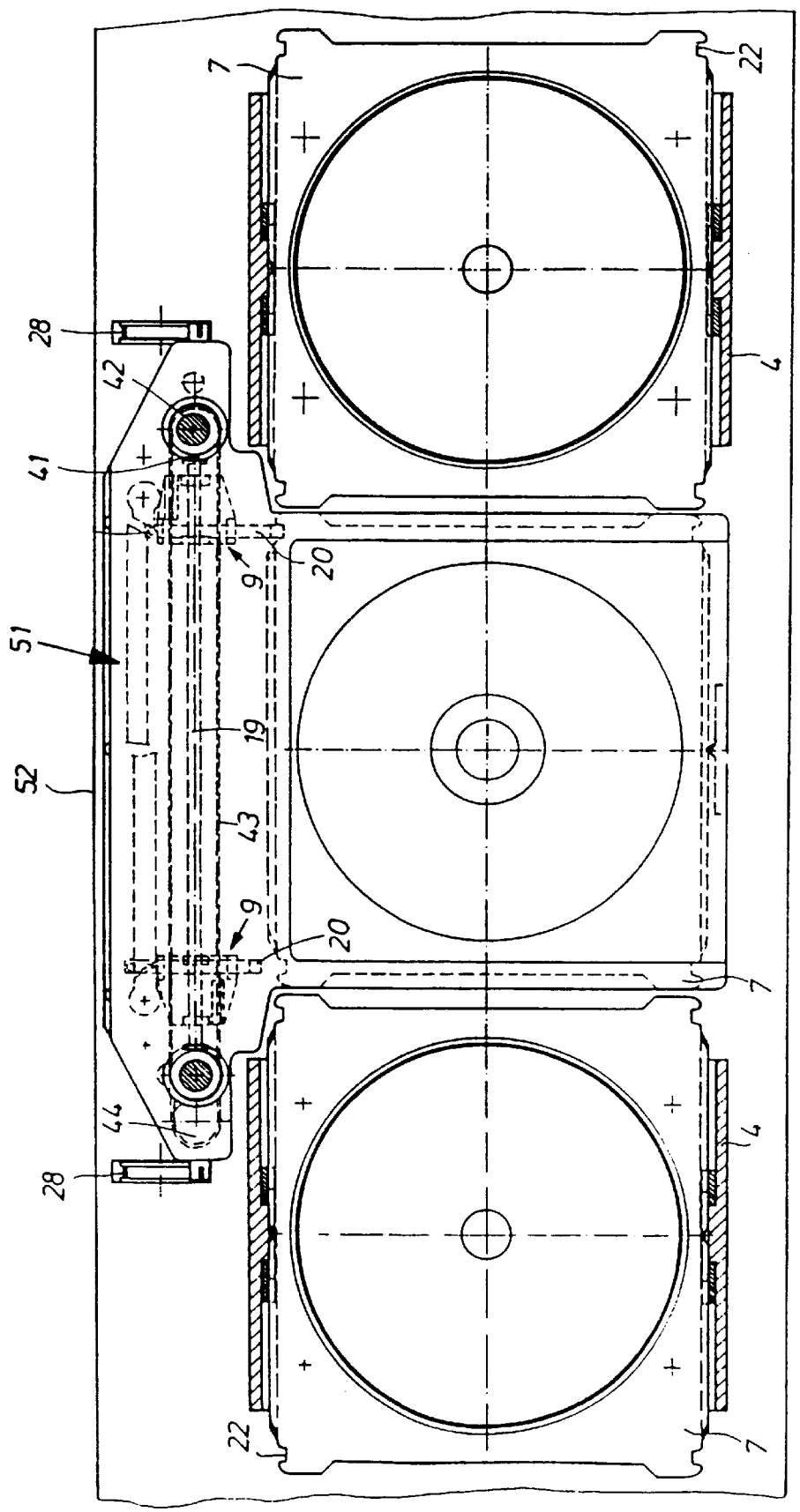
Figure 3C:
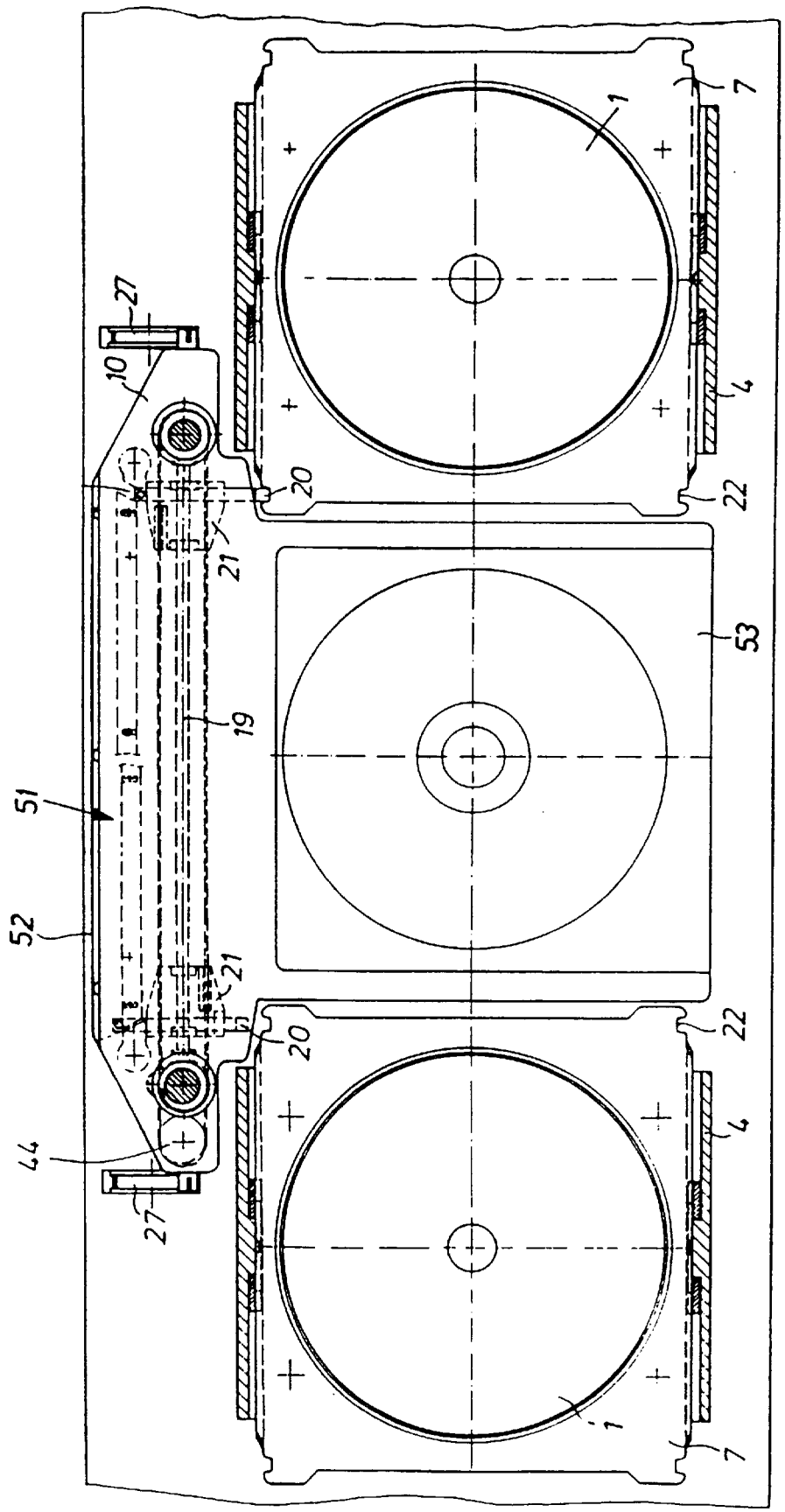
Figure 4:
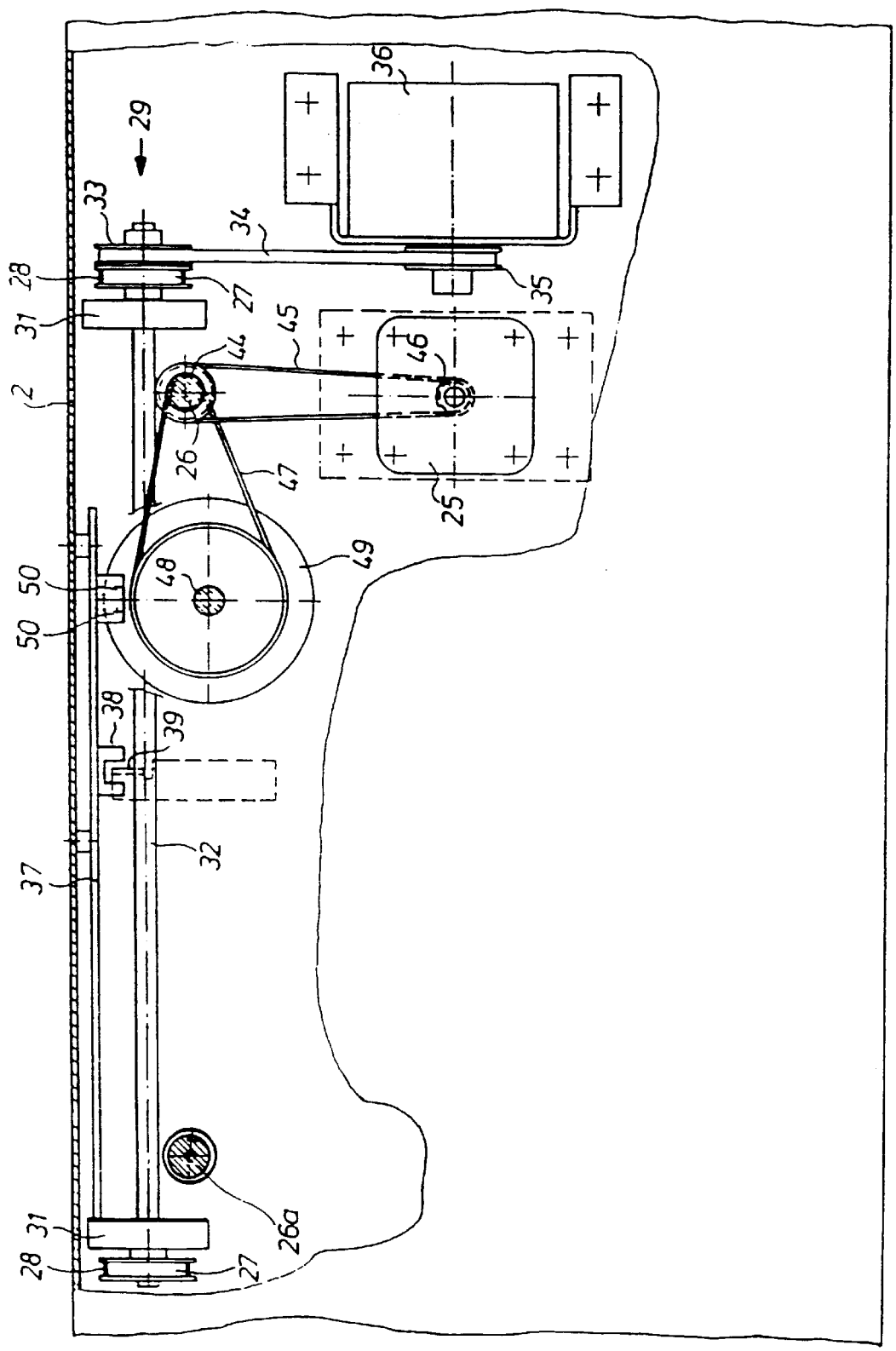
FIG. 4 is a partial section of a view from below of the machine according to FIG. 1.
Figure 5A:
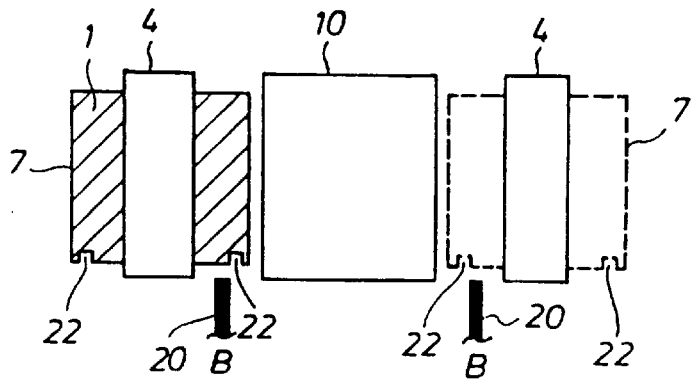
FIGS. 5a to 5g are basic diagrams of the operating positions for the pull-out means when changing a disk holders with a disk from the right disk magazine to the left disk magazine.
Figure 5B:
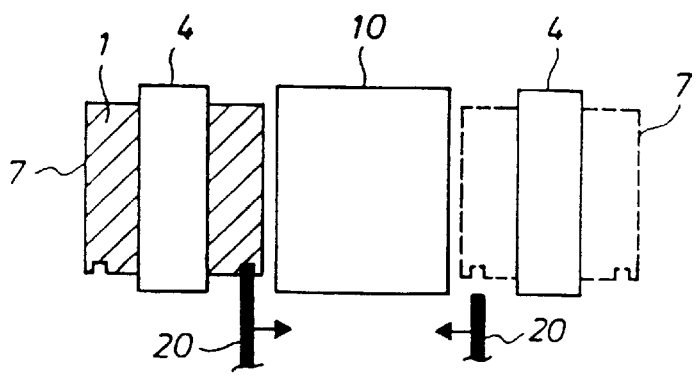
Figure 5C:
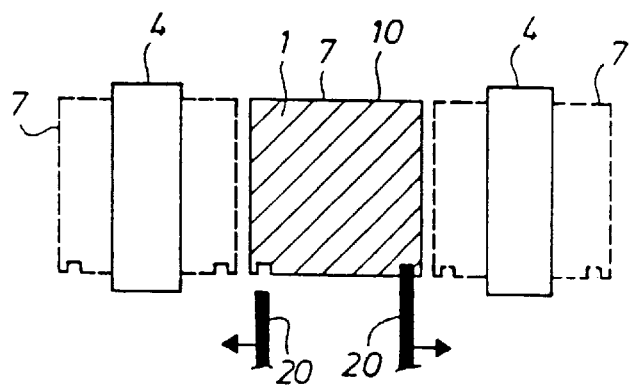
Figure 5D:
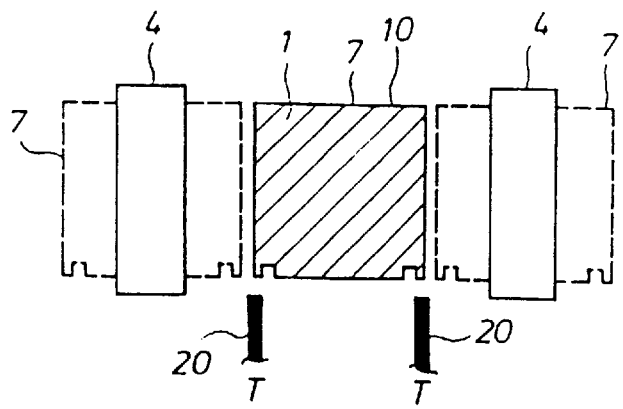
Figure 5E:
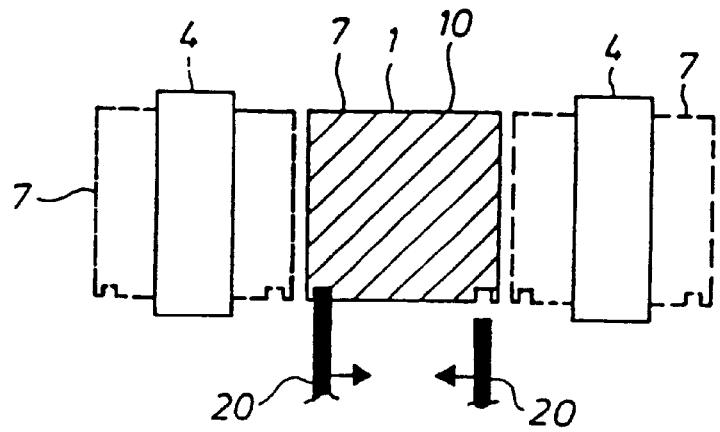
Figure 5F:
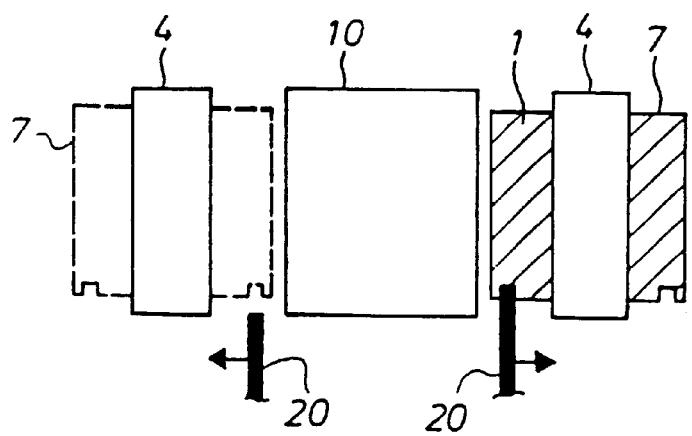
Figure 5G:
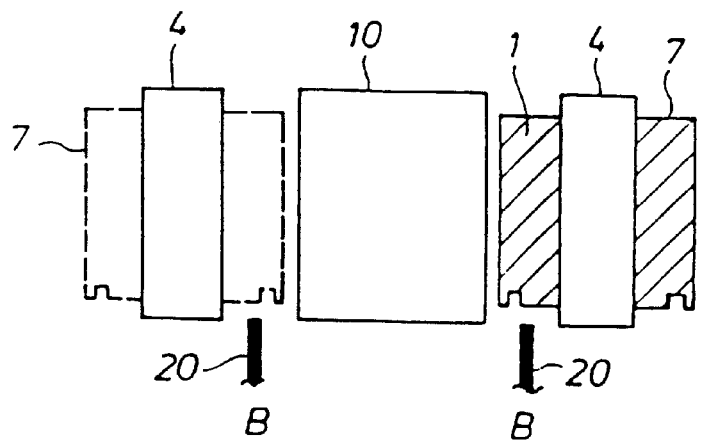

If, for example, a disk holder 7 with inserted disk 1, which is stored in the right disk magazine 4, is to be transported in the same plane to the opposite-arranged left disk magazine 4, then the transport device 10 moves from its starting position to a height that coincides with the height for the receiving compartment 6 of the right disk magazine 4, in which the disk holder 7 with the disk to be transported is located. In this position for the transport device 10, the gripping sliders 20 of the carriages 21 for the pull-out means 9 are in the readiness position (compare FIG. 5*a*). Following that, the gripping slider 20 assigned to the disk holder 7 with inserted disk 1, is made to engage into the corresponding recess 22 on the disk holder 7 (compare FIG. 5*b* and FIG. 3*a*). Both gripping arms 20 subsequently perform a synchronous movement in opposite direction until the disk holder 7 with disk 1 has reached its end position in the transport device 10 (compare FIG. 5*c*). The gripping slider 20, which is engaged in the disk holder 7, is then disengaged from the disk holder 7. As a result of this, both gripping sliders 20 are in the transport device position (compare FIG. 5*d*). At this stage, the gripping slider 20 that previously was not engaged in the disk holder 7 is moved from its transport device position to an engagement position with the recess 22 of disk holder 7 that is facing it (compare FIG. 5*e*). This gripping sliders 20 subsequently again perform a synchronous, intersecting movement in opposite direction until the disk holder 7 with disk 1 has reached its end position in the left disk magazine 4 (compare FIG. 5*f* and FIG. 3*c*). This gripping slider 20 is subsequently moved out of the disk holder 7, as a result of which both gripping sliders 20 are now once more in the readiness position for removing a disk holder 7 from one of the disk magazines 4(compare FIG. 5*g*). The movement sequences for the other possible transport paths for the disk holder 7 with a disk 1 run down in a correspondingly analogous way, e.g., from a disk magazine 4 to a disk drive 5 or from the disk-loading/extracting drawer 11 to a disk magazine.

Figure 6A:
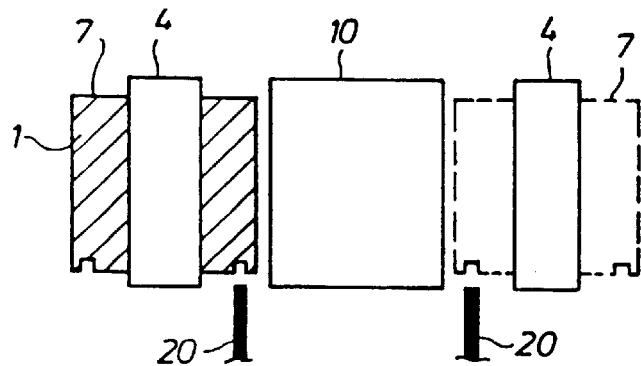
FIGS. 6a to 6e are basic diagrams of alternative operating positions for the pull-out means when changing a disk holder with a disk from the right disk magazine to the left disk magazine.
Figure 6B:
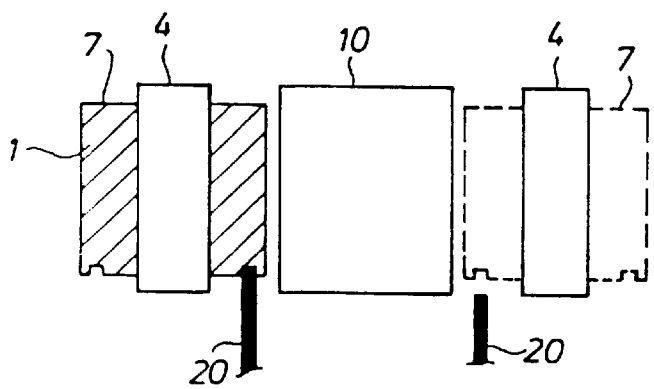
Figure 6C:
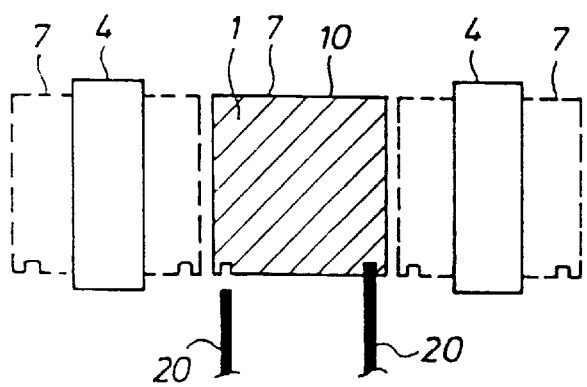
Figure 6D:
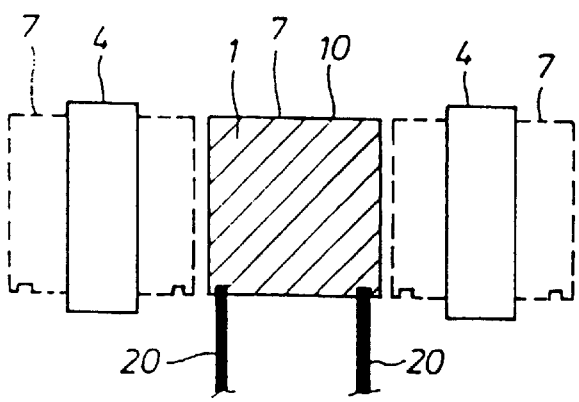
Figure 6E:
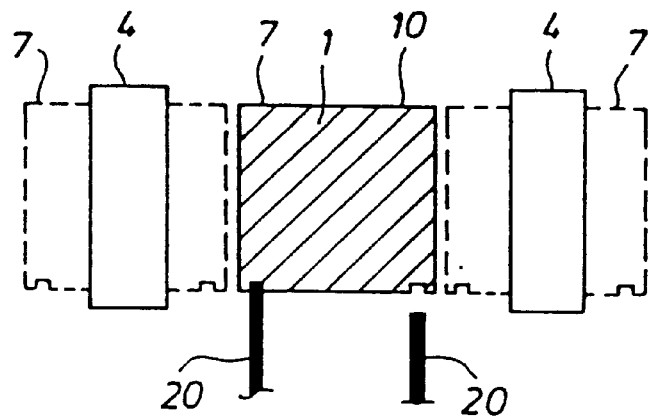
Figure 6F:
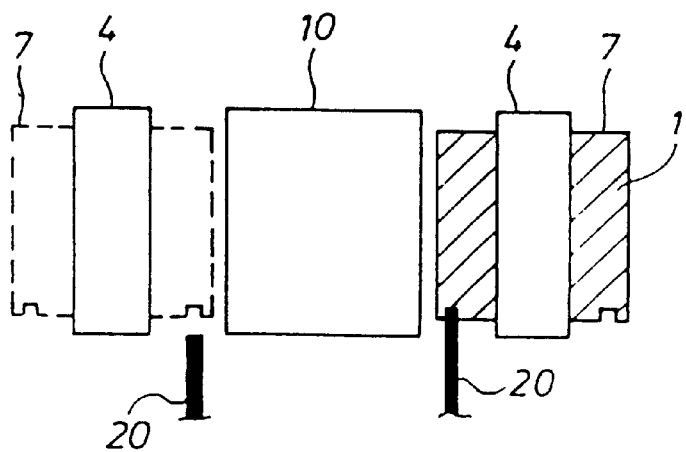
Figure 6G:
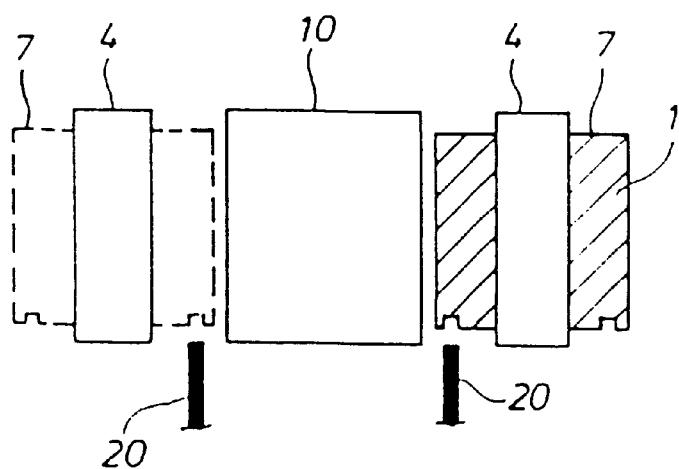

With a correspondingly different structural design for the link motion 51, the following step may run down sequentially if a disk holder 7 with inserted disk 1 is changed from the right disk magazine 4 to the left disk magazine 4: from the readiness position (compare FIG. 6*a*), the gripping slider 20 that is assigned to the right disk magazine 4 is made to engage with the disk holder 7 with coordinated disk (compare FIG. 6*b*), selected from this disk magazine 4. The gripping sliders 20 subsequently perform a synchronous movement in opposite direction until the disk holder 7 with disk 1 is moved to its end position in the transport device 10 (compare FIG. 6*c*). The other gripping slider 20 is subsequently also moved to an engagement position with the disk holder 7 (compare FIG. 6*d*). Following this, the gripping slider 20 that initially engaged into the disk holder 7 is disengaged from the disk holder 7 (compare FIG. 6*e*). At this stage, the gripping sliders 20 again perform an intersecting movement in opposite direction, that is until the disk holder 7 with disk 1 has been moved into its end position in the left disk magazine (compare FIG. 6*f*). The right gripping slider 20 is subsequently disengaged from the disk holder 7, as a result of which both gripping sliders 20 again resume their readiness position (compare FIG. 6*g*). In this case, a gripping slider 20 is thus always engaged with a disk holder 7 during the transport of the disk holder 7.

The internal computer 13 for the machine comprises a central unit 56, a BIOS unit 57, a RAM 58 and an interface 59 to an external computer, which is not shown here and with which the internal computer 13 communicates, as is indicated by the double arrow 60. Another interface 61 is provided for the connection to a number of drives $5_1, 5_2 \ldots 5_N$, respectively with interfaces $62_1, 62_2, \ldots 62_N$. The interface 61 is connected via a line 63 and branch lines $64_1, 64_2 \ldots 64_N$ to the interfaces $62_1, 62_2, \ldots 62_N$. The internal computer 13 furthermore comprises an additional interface 64, which connects the computer via a line 65 to the transport device 10.

The interfaces 59, 61, 64 of the internal computer 13 are connected via lines 65, 66, 67, as well as a line 68, and lines 69, 70, 71 to the central unit 56, the BIOS unit 67 and the RAM 68. An intermediate memory 72 is integrated with the internal computer 13 and is connected via a line 73 to the respective units of the internal computer 13. The intermediate memory 72 can be a hard disk or a CD-ROM. The internal computer 13 controls and monitors the complete equipment and performs all communication with the external computer. It also manages the intermediate memory 72. The number of drives $5_1, 5_2 \ldots 5_N$ for the external computer appear from the outside as one large, but interconnected content directory. In order to obtain access to the individual disks 1, the software for the external computer must only branch out into another directory. The internal computer 13 performs such operations as disk exchange, data polling etc., for which the transport device 10 is used.

The internal computer 13 for the playback and/or recording and/or extracting machine also has an incremental signal generator 74 for the incremental position detection of drive motor 25 for the pull-out means 9 or the drive motor 36 for the transport device 10. The incremental signal generator 74 consists of one optical two-phase encoder, a code disk 49, a quadrature decoder and the sensor 38. The quadrature decoder is a component of the central computer unit 13 for the machine.

Within the turning range of the drive motor 25 for the pull-out means 9 or the drive motor 36 for the transport device 10 are positions, which must be traveled to during normal operations of the machine. The positions are at a distance, defined in the design, to at least one limit stop that is formed, for example, by the sensors 50 as end-point sensors. If the central computer unit 13 is familiar with the absolute position for the respective drive motor, then each position within the turning range can be traveled to with accurate steps. Following the start-up of the drive motor, or after a malfunction, the central computer unit 13 does not know the absolute position of the drive motor and must first determine it. If a sensor 38 as reference-point sensor, which divides the turning range into two sections (namely the transport device: below/above; or the pull-out means: outside/inside) is installed in an optional position within the turning range of the drive motor 25 or 36, and if its distance to at least one of the sensors 50 is known, then the central computer unit 13 can balance itself when it travels across the sensor 38 and thus is familiar with the absolute position of the drive.

In accordance with the manufacture of the machine, the distance between the sensor 38 and the sensors 50 is not known and must be measured in a one-time adjustment operation. For this and with the current switched off, the drive motor 25 or 36 is turned manually toward one of the sensors 50 of the turning range. The central computer unit 13 subsequently controls the movement of the corresponding transport device 10 or the pull-out means 9 across the sensor 38. The path traveled in motor steps is stored in the non-volatile memory 72 of the central computer unit 13.

Figure 7:
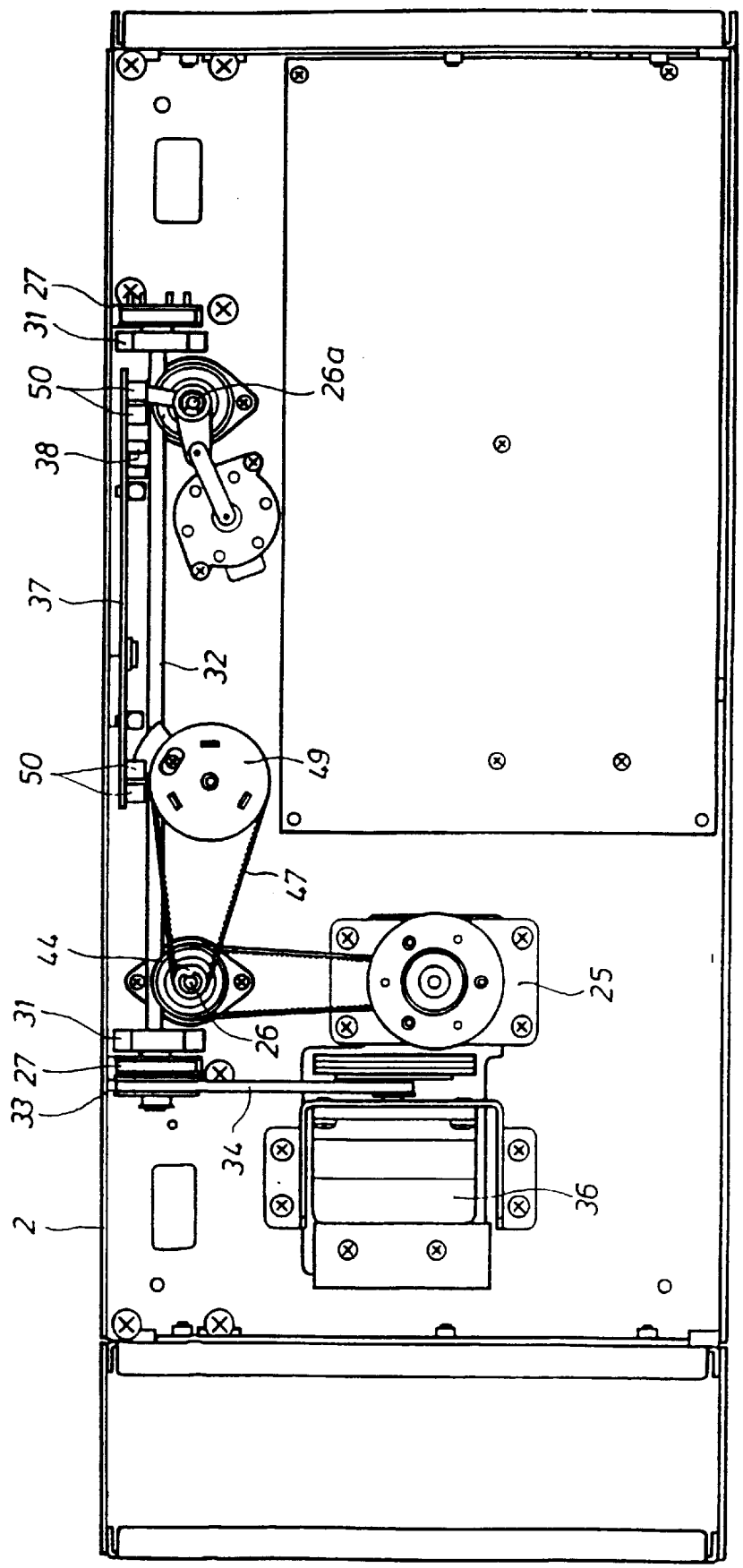
FIG. 7 is another embodiment of the representation according to FIG. 4.
Figure 8:
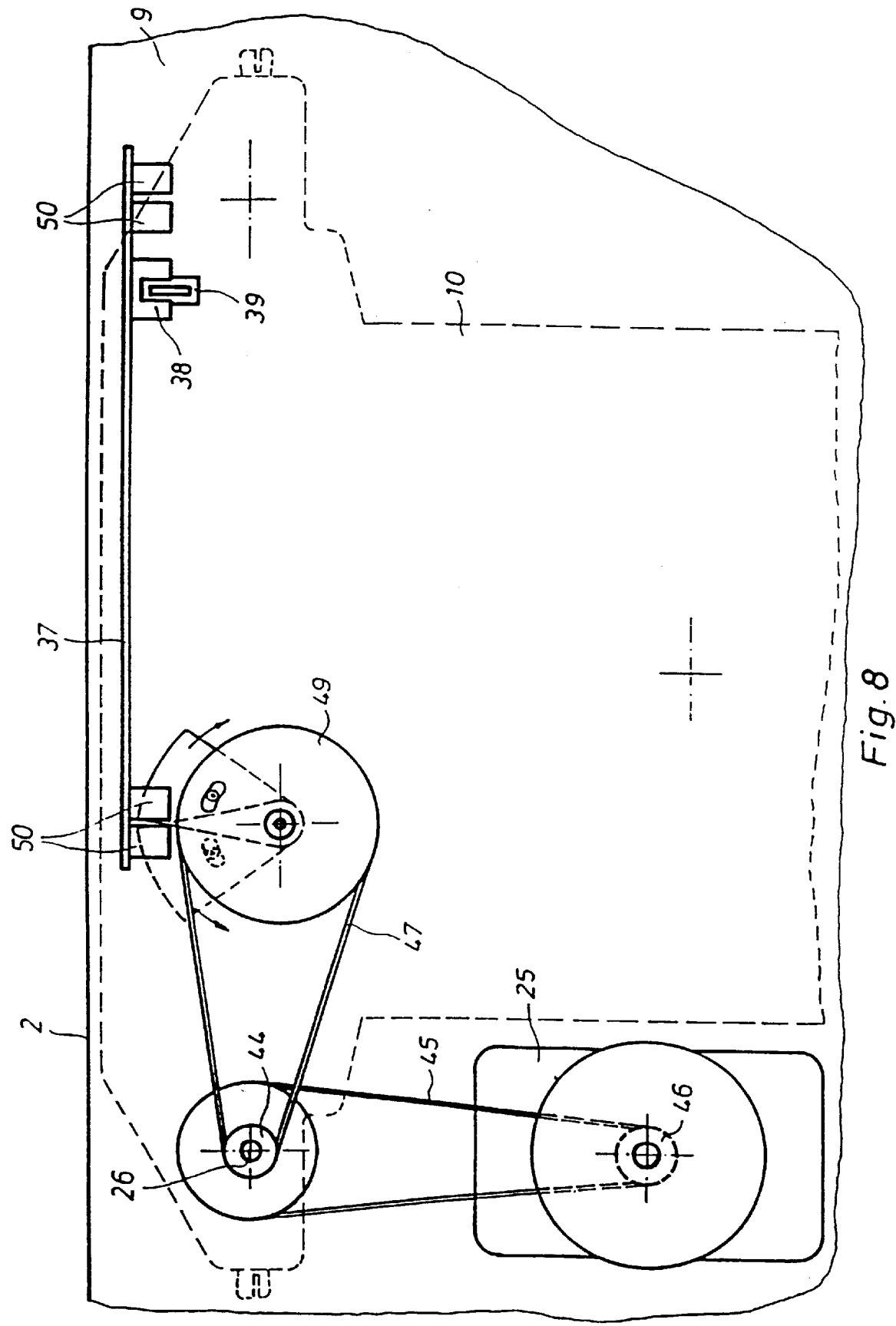
FIG. 8 shows the drive for a code disk for the pull-out means according to FIG. 7.
Figure 9:
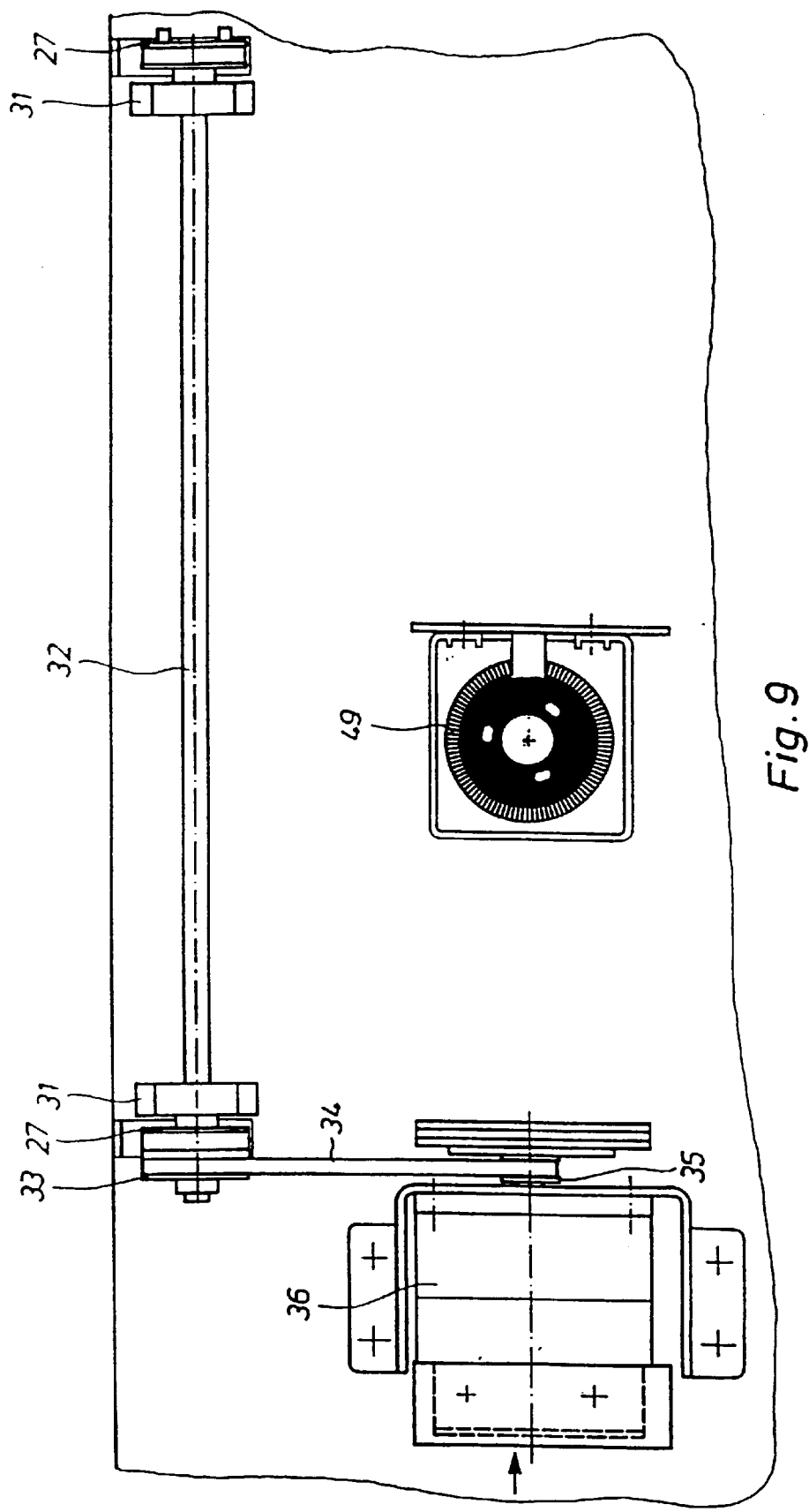
FIG. 9 shows the drive for the transport device according to FIG. 7.
Figure 10:
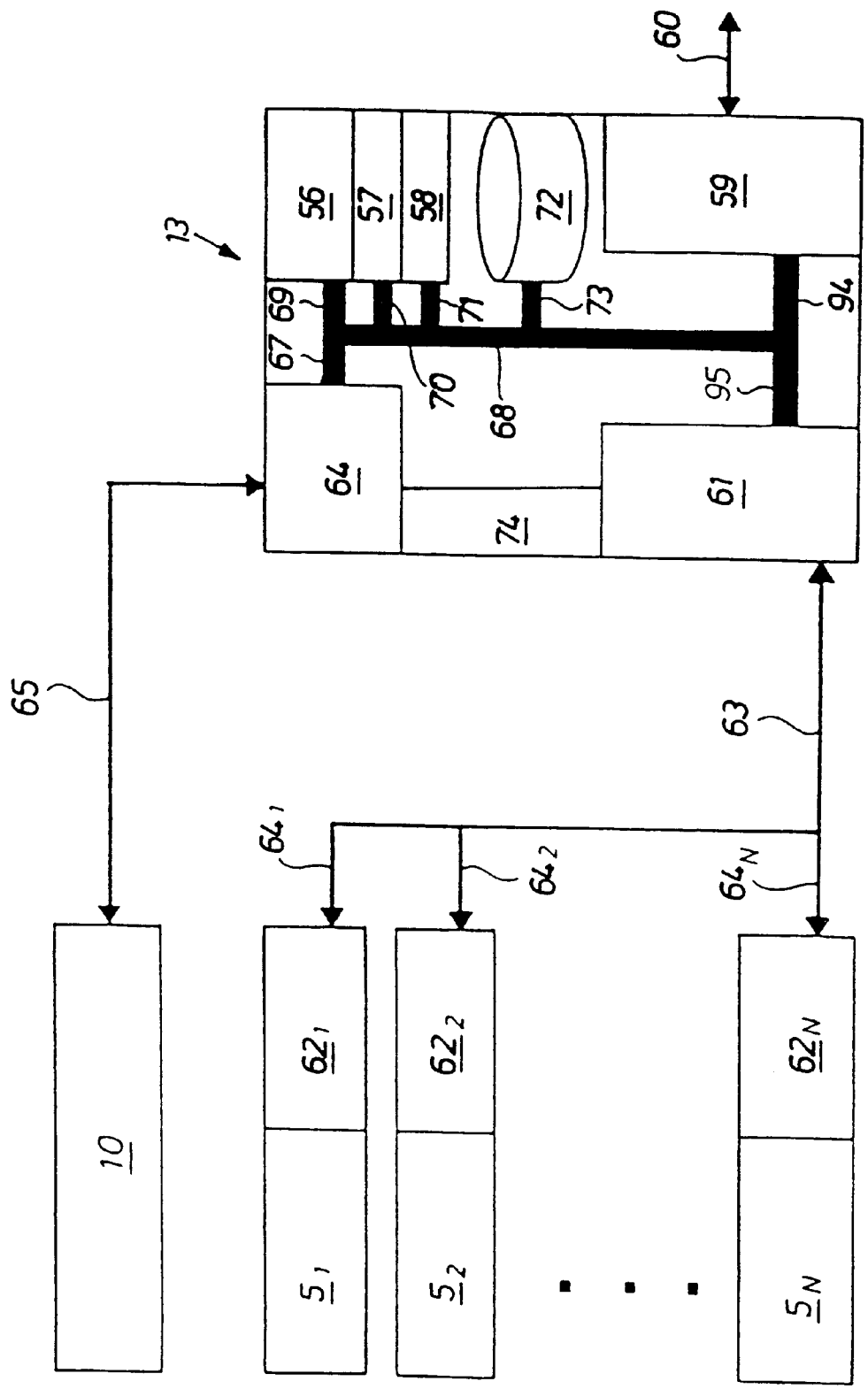
FIG. 10 is a block diagram for controlling the machine according to FIG. 1.

In accordance with FIGS. 7 and 8, the pull-out means 9 has respectively one sensor 50 near the right and the left limit stop for the turning range of the drive motor 25. Each sensor 50 is adjusted separately. The central computer unit 13 decides in each case which sensor is to be used to balance its count. The advantage here is that the drive motor 25 does not have to travel through the complete turning range for determining the absolute position, but only to the closest sensor 50. Once the manual adjustment has been completed, the computer unit 13 also measures the distance between the sensors 50, which results in the total turning range in motor steps. The computer unit 13 uses the knowledge of the total turning range to compute the start-up and braking curves for the drive motor 25.

A sensor 50 is provided in the same way near-the lower bottom of the machine in order to balance the transport device 10. The manual adjustment is limited to a pushing downward of the transport device 10.

I claim:

1. A machine for handling disks configured as information carriers, with said machine comprising:

opposite-arranged disk magazines (4), which hold disk holders (7) for respectively one disk (1) in superimposed receiving compartments (6), a first transfer device (10) in the form of a transport device (10) that is arranged between the disk magazines (4) and is connected to a first electric drive motor (36), for the optional transport of an individual disk holder (7) with the disk (1) between optional receiving compartments (6), between a receiving compartment (6) and at least one disk drive for reading out or recording information on the disk, or between a receiving compartment (6) or a disk drive (5) and a drawer (11) for the inserting or extracting of disks (1), a second transfer device, arranged on the first transfer device (10), in the form of two displaceable pull-out means (9) that are connected to a second electric drive motor, for removing and inserting respectively one disk holder (7) with disk (1) into or from an optional receiving compartment (6), a computer-supported control unit (13) for controlling and monitoring the movement sequences of the two transfer devices (9, 10), characterized in that each drive motor (25, 36) is a step motor with reversible rotational direction, each step motor (25, 36) is coordinated with an incremental signal generator (74) for generating counting pulses corresponding to the motor movement, as well as an instrument for counting these impulses, at least one end position of its movement range is fixed for each transfer device (9, 10) and at least one reference-point a sensor (38) is provided, which monitors a reference position within the movement range and which responds if the respective transfer device (9, 10) travels across this position, for each transfer device (9, 10), the control unit (13) can be switched to a first operating state for calibration in which it switches off the current to the respective step motor (25, 36) in order to allow a manually guided movement of the respective transfer device (9, 10) by counting the counting pulses supplied by the respective incremental signal generator (74), and in which the count that has run up when the reference-point sensor (38) responds and when the end position is reached can be detected and stored, the control unit (13) for each transfer device (9, 10) can be switched to a second operating state for calibration, in which it drives the corresponding step motor (25, 36) for moving the respective transfer device (9, 10) and counts the thereby generated counting pulses of the coordinated incremental signal generator (74) and in which the count that has run up when the reference-point sensor (38) responds and the end position is reached can be detected and stored.

2. A machine according to claim 1, wherein an end-point sensor (50) is provided for the purported end position.

3. A machine according to claim 2, wherein respectively one end-point sensor (50) is provided for both end positions of the movement range for the respective transfer device (9, 10).

4. A machine according to claim 3, wherein the movement range for the respective transfer device (9, 10) corresponds to the turning range for the coordinated step motor (25, 36).

5. A machine according to claim 4, wherein the step motor (25, 36) for each transfer device (9, 10) is a four-phase step motor.

6. A machine according to claim 4, wherein the incremental signal generator (74) respectively consists of an optical two-phase encoder with code disk (49) and a quadrature decoder.

7. A machine according to claim 6, wherein the code disk (49) is a slotted disk.

8. A machine according to claim 7, wherein the slotted disk is provided with 100 slots.

9. A machine according to claim 6, wherein the quadrature decoder is a component of the control unit (13) for the machine.

10. A machine according to claim 6, wherein the code disk (49) is arranged on the motor axle and the optical two-phase encoder is arranged on the housing for the drive motor (25, 36).

11. A machine according to claim 1, wherein the first transfer device (10) is positioned such that it moves in a sliding manner on two parallel-extending, vertically arranged guide rods (26, 26*a*) and that it can be moved up and down via at least one belt drive (29) by the coordinated step motor (36).

12. A machine according to claim 11, wherein one of the guide rods (26, 26*a*) for the first transfer device (10) is positioned such that it rotates, and that in order to convert its rotational movement to a translatory movement for the carriages (21) of the second transfer device (9), this guide rod (26) on the one hand is connected via a non-rotating toothed wheel (42), which can be displaced on the guide rod, to the toothed belts (43) of a belt drive (40) that is connected to carriages (21) and, on the other hand, via an additional belt drive (45) to the step motor (25) for the second transfer device (9).

13. A machine according to claim 12, wherein the rotating guide rod is connected via an additional belt drive (47) with a code disk (49) of the associated incremental signal generator (74).

14. A process for operating a machine according claim 1, wherein in order to measure the location of the reference position for the transfer device (9; 10), the two operating states for calibration of the control unit (13) are successively switched on, wherein during the one operating state, the respective transfer device (9; 10) is guided over the reference position and the count for the pulses from the associated incremental signal generator (74), which has run up when the reference position is reached, is recorded and wherein during the other operating mode, the transfer device is moved to the one end position of the movement range and the count reached when the end position is reached is recorded, the distance of the reference position from said end position is determined from the two recorded counts and is stored as a number of motor steps in a non-volatile memory, during the useful operation of the device, the stored distance data is used as information on the absolute location for the reference position.

15. A process for operating a machine according to claim 1, wherein following the start-up of the machine, the second operating state for calibration of the control unit (13) is switched on, wherein the respective transfer device (9; 10) is moved by the corresponding step motor (25; 36) across the reference position and the count for the incremental signal generator (74) pulses, reached when the respective reference-point sensor responds, is converted to a count relative to the motor step count, is stored in a memory and, for as long as the machine is switched on, is used during the subsequent useful operation of the machine as reference value for the position determination of the step motor.

16. A process according to claim 14, wherein the counts for the incremental signal generator pulses are supplied as a number of motor steps, and that the motor steps per rotation of the step motor (25; 36), which are detected by an encoder, are used for dimensioning.

17. A process according to claim 16, wherein the count for the incremental signal generator pulses is evaluated prior to, during, and following the movement of the respective transfer device (9; 10).

18. A process according to claim 16, wherein the step motor position is calibrated separately with the aid of each end position when two end-point sensors (50) exist.

19. A process according to claim 16, wherein the step motor position is calibrated with the aid of the closest end-point sensor when two end-point sensors (50) exist.

20. A process according to claim 14, wherein the distance between the two end positions is measured in order to determine the total turning range for the step motor (25; 36) in motor steps.

21. A process according to claim 20, wherein the knowledge of the total turning range of the step motor (25; 36) is used by the control unit (13) for computing the start-up and braking distances for the step motor.

22. A process according to claim 17, wherein during the useful operation of the device, the step sequence transmitted to the step motor (25, 36) is compared to the respective count for the incremental signal generator pulses, wherein the step motor is shut down for a difference greater than plus or minus four motor steps.

23. A process according to claim 17, wherein during the useful operation of the machine and following a movement of the respective transfer device (9; 10), the actual position is computed from the count for the incremental signal generator pulses and is compared to the desired position preset by the control unit (13).

24. A process according to claim 17, wherein the shut-down step motor (25; 36) is readied for operation by supplying it with current of an optional phase and that the actual position is computed from the count for the incremental signal generator pulses and is transmitted to the control unit (13).

25. A process according to claim 17, wherein the completion of the decay process of the respective transfer device (9; 10), following the completion of the movement, or after the step motor is again supplied with current, is determined with a periodic test in that the count change falls short of a specific amount.

* * * * *